Nov. 8, 1960  J. D. ADAMSON  2,959,271
ACCELERATION CONVEYOR
Filed Aug. 14, 1957  3 Sheets-Sheet 1
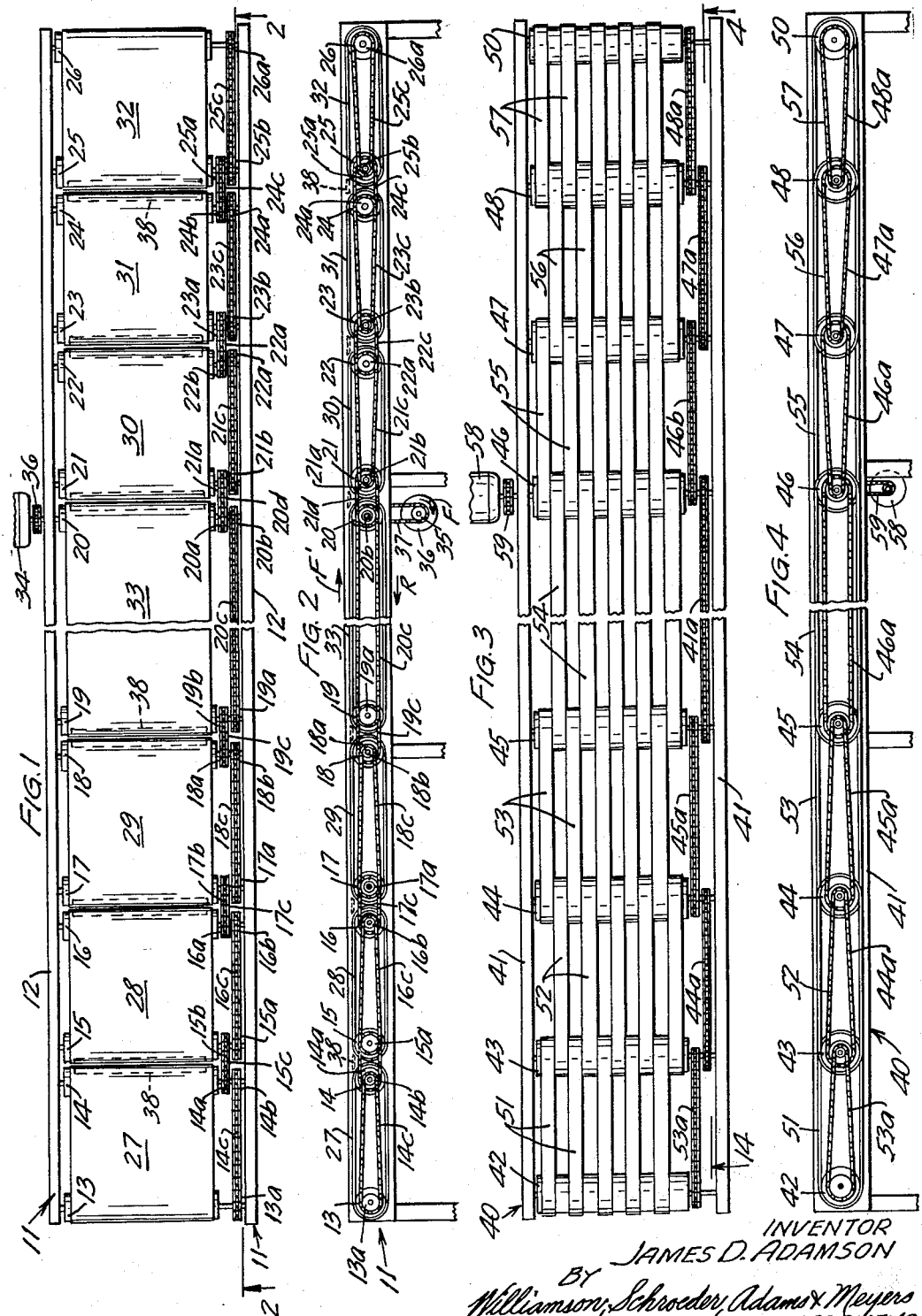
INVENTOR
JAMES D. ADAMSON
BY
Williamson, Schroeder, Adams & Meyers
ATTORNEYS

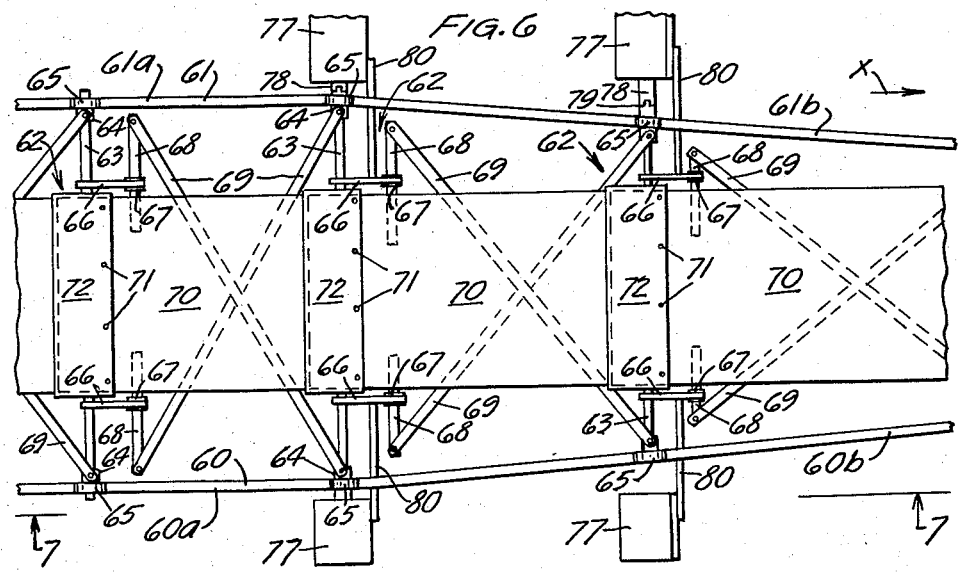
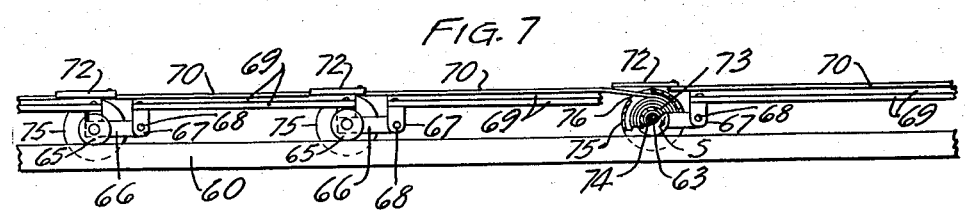
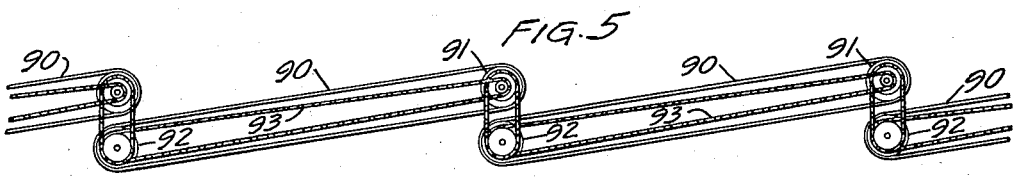
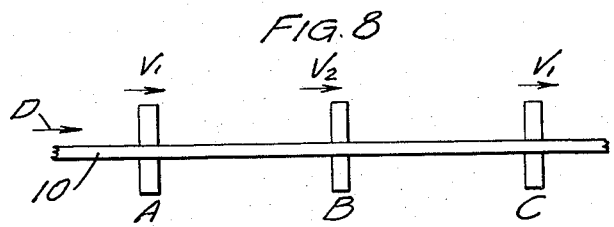

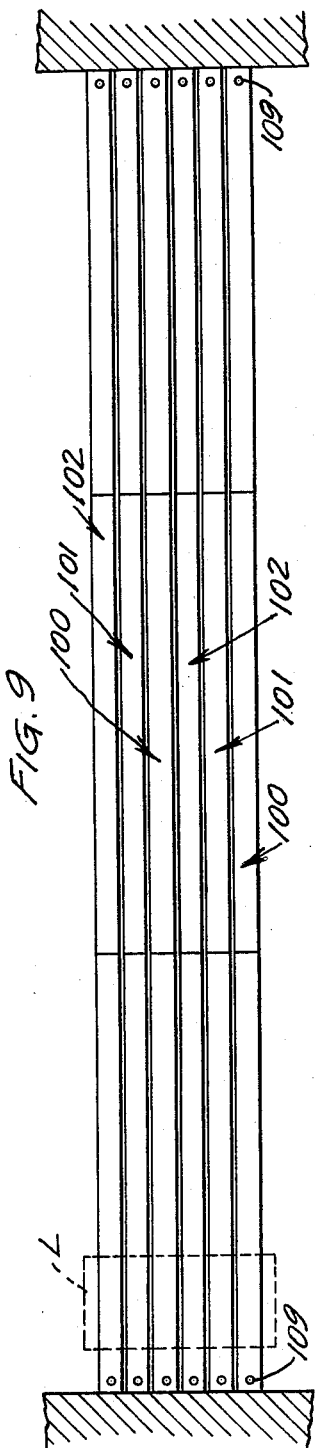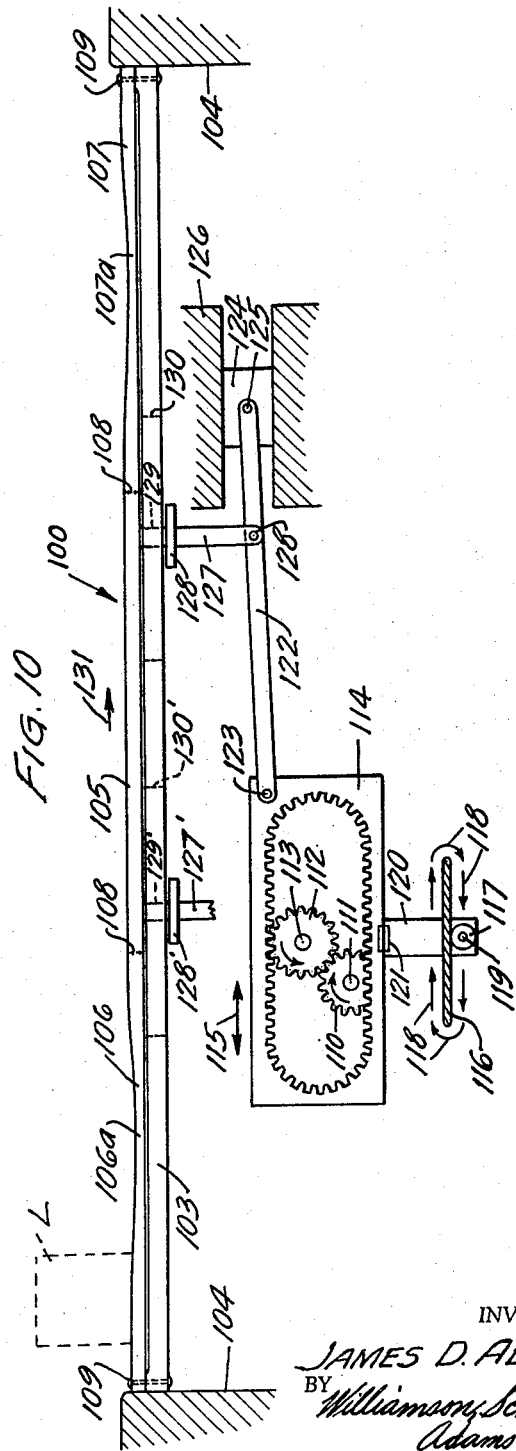

United States Patent Office 2,959,271
Patented Nov. 8, 1960

2,959,271

ACCELERATION CONVEYOR

James D. Adamson, 3315 Zinran Ave., Minneapolis 26, Minn.

Filed Aug. 14, 1957, Ser. No. 678,114

4 Claims. (Cl. 198—110)

This invention relates to conveyors and more particularly relates to conveyors of the type for producing changes in the velocity at which objects are carried.

The fullest possible use of high speed conveyors has not been made in the past because of problems in accelerating certain types of loads. Multi-stage conveyors are known wherein each conveyor stage has a constant speed which is slightly less than and slightly greater than the speeds of the conveyor stages adjacent thereto. Such types of conveyors are not well adapted for carrying passenger loads because of the dangers and inconveniences involved as a person steps from one conveyor stage to another. Difficulties are also presented in using high speed conveyors in carrying loose aggregate such as ore, because if the conveyor has substantial forward speed as compared to that of the aggregate, the aggregate tumbles and rolls on the conveyor and causes substantial spillage.

An object of my invention is to provide a new and improved conveyor of relatively simple and inexpensive construction and operation for changing the speed of loads carried thereby.

Another object of my invention is the provision of a novel conveyor which is constructed to facilitate rapid and smooth acceleration of the load carried thereby.

A further object of my invention is to provide a new and novel conveyor of the type having a multiplicity of stages, each of which produces a rapid and smooth acceleration of the load and has substantially no velocity differential with adjacent stages of the conveyor.

These and other objects and advantages of my invention will more fully appear from the following description made in connection with the accompanying drawings wherein like reference characters refer to the same parts throughout the several views and in which:

Fig. 1 is a top plan view, partly broken away, of a conveyor incorporating the present invention;

Fig. 2 is a longitudinal section view taken on a substantially vertical plane as indicated at 2—2 in Fig. 1;

Fig. 3 is a top plan view, partly broken away, of a modified form of conveyor employing the present invention;

Fig. 4 is a longitudinal section view taken on a vertical plane as indicated at substantially 4—4 in Fig. 3;

Fig. 5 is a diagrammatic elevation view of another modified form of the invention, but similar to that shown in Fig. 1 and Fig. 2;

Fig. 6 is a top plan detail view of still another modified form of a conveyor incorporating the present invention;

Fig. 7 is a detail longitudinal section view taken on a substantially vertical plane as indicated at 7—7 in Fig. 6 and having portions of the structure broken away for clarity;

Fig. 8 is a diagrammatic sketch of a simplified mechanism to show the principles involved in the present invention, and Fig. 9 is a top plan view, partly broken away, of another modified form of the invention;

Fig. 10 is an elevation view of one of the units of the form of the invention shown in Fig. 9.

The present invention can best be understood by preliminary consideration of the simplified mechanism shown diagrammatically in Fig. 8. Assuming that the elongated element 10 is a portion of a substantially continuous elastic strip which moves through speed control devices which are indicated by letters A, B and C respectively and which act upon elastic element 10 in such a manner as to precisely control the velocity at the particular point of engagement with the elastic element. Next assume that the elastic element traveling in the direction of arrow D at a speed $V_1$ which is the speed imparted to the element 10 by the mechanisms A and C. If mechanism B drove the element 10 at the same velocity $V_1$, the element 10 would pass through the three mechanisms without being affected. But assume that mechanism B drives the elastic element 10 at a velocity $V_2$ which under the assumed conditions may be higher in feet per second than $V_1$. The same quantity of material, from which element 10 is constructed, will pass each of the mechanisms in any unit of time. As the element 10 progresses from mechanism A to mechanism B the velocity at any point on the element 10 must increase from $V_1$ to $V_2$. To permit this increase in velocity the element 10 must stretch and of course there will be a corresponding decrease in the cross sectional thickness or width. At mechanism B a greater number of linear feet per second of element 10 will pass in any unit time as compared with the linear feet per second at mechanism A, but because of the contraction in cross sectional area as the element 10 moves from mechanism A to B, the same quantity or volume of material passes A and B per unit of time.

Similarly the identical quantities of the element 10 pass the mechanisms B and C in any unit time. Because the velocity imparted to the element at mechanism C is less than the velocity $V_1$ at mechanism B, the feet per second at mechanism C is less than the feet per second at mechanism B. However because the element 10 is elastic the element will longitudinally contract and the cross sectional area will increase as the element moves from mechanism B to mechanism C.

In view of the foregoing, it will be noted that any point on the elastic element 10 will have a positive acceleration, or an increase in speed as the element 10 moves from mechanism A to mechanism B, and furthermore the point will have a negative acceleration, or decrease in speed as it passes from mechanism B to mechanism C.

The mechanisms A, B and C might take the form of pulleys or rollers over which the elastic element 10 travels. If the elastic element 10 were arranged as an endless belt and the mechanisms A and C were to be replaced by a single mechanism such as a pulley for mounting and driving the belt around a pulley at B, a belt-type conveyor would result. With this foregoing in mind a detailed understanding of the specific embodiment of the invention shown may be had.

The conveyor shown in Fig. 1 and Fig. 2 is a multi-stage acceleration conveyor adapted to accelerate a load and apply the same to a constant, high speed conveyor and to then receive a load therefrom and decrease the speed thereof. The construction shown in Figs. 1 and 2 includes a supporting structure indicated in general by numeral 11 and having a pair of side frame members 12 having a plurality of pulleys 13—26 journalled thereon. The pulleys 13—26 are arranged in widely spaced pairs around which the extendible and retractable elastic conveyor belts 27—32 are trained, and endless nonstretchable conveyor belt 33 trained about the pulleys 19 and 20. A source of rotary power is provided for driving the several conveyor belts and in the form shown, such a source comprises the motor 34 which is drivably connected to sprockets 35 and 36, and roller chain 37 to the shaft of pulley 20 for turning the pulley 20. The shaft of roller 20 has another pair of sprockets 20a and 20b thereon which are drivably connected through chain 20c and sprocket 19a to the pulley 19 and through chain 20d and sprocket 21a to the roller 21. Roller 19 is connected through the shaft thereof, sprocket 19b, chain 19c and sprocket 18a to the pulley 18 for driving the same. The rotation speeds of all of the pulleys 18, 19, 20 and 21 are identical because the several sprockets in driving relation are all identically sized.

The shaft of pulley 18 is drivably connected through sprocket 18b and chain 18c and sprocket 17a to the shaft of pulley 17. It will be noted that there is a step-down speed ratio between the pulleys 18 and 17, because the sprocket 18b is smaller than the sprocket 17a. The shaft of pulley 17 is drivably connected in a one to one speed ratio by sprocket 17b, chain 17c and sprocket 16a to the pulley 16. The shaft of pulley 16 is drivably connected in a step-down speed ratio by sprocket 16b, chain 16c and sprocket 15a to the roller 15 for driving the same at a slower rate than roller 16. Roller 15 is drivably connected in a one to one speed ratio through the sprocket 15b, chain 15c and sprocket 14a to the roller 14. The shaft of pulley 14 is drivably connected in a step-down speed ratio through sprocket 14b, chain 14c and sprocket 13a to the pulley 13.

In a similar manner the rotary power is supplied from the shaft of pulley 21 in a step down speed ratio through the sprocket 21b, chain 21c and sprocket 22a to the pulley 22. The pulley 22 is drivably connected in a one-to-one speed ratio to sprocket 22b, chain 22c, and sprocket 23a to the roller 23. The pulley 23 is connected in a step-down speed ratio to the pulley 24 by sprocket 23b, chain 23c and sprocket 24a. The pulley 24 is drivably connected in a one to one speed ratio to pulley 25 by sprocket 24b, chain 24c and sprocket 25a. Pulley 25 is connected in a step-down speed ratio to pulley 26 by sprocket 25b, chain 25c and pulley 26a.

It will therefore be seen that each of the elastic conveyor belts 27—32 is drivably connected to the source of rotary power and has spaced portions, at the opposite ends of the load-carrying run, driven at different linear feet per second velocities. The sprockets and interconnecting chains between the cooperating pairs of pulleys retards the linear velocity of the belt at one end and produces progressive and varying extension of the elastic conveyor belt as it moves along the run, and between the pulleys.

Belts 27—32 may be constructed of any suitable elastic material such as rubber, and of course the belts must be constructed so as to minimize the slippage between the belt and pulleys. It may be desirable to provide toothed pulleys and cooperating elastic toothed belts so as to positively prevent slippage of the belt on the pulley. Of course it is necessary that the longitudinal expansion of the belts 27—32 should not exceed the elastic limit of the material from which the belts are constructed. The belts will have an initial tension so as to be maintained in driving relation with the pulleys, and in addition, one of the runs of each belt will have a "differential tension" applied thereto due to the velocity differential between the pulleys at the opposite ends thereof, and the sum of the initial tension and differential tension must not exceed the elastic limit of the material. As one of the runs of each belt is being continuously stretched, the belt, in the other run is continuously contracting because the tensioned belt is being supplied into that run at a linear feet per second velocity which exceeds the linear feet per second velocity of the belt moving out of the run. In this run, the belt longitudinally contracts so that the same quantities of belt material are supplied to and taken out of the run in any unit of time.

It should be understood that belt-supporting skid plates may be provided beneath the upper load-carrying run of each of the conveyor belts. Furthermore, inter-stage, load-supporting skid plates shown in dotted lines, and indicated by numeral 38, may be provided for providing a substantially smooth surface over which the load passes as it moves from stage to stage.

If the motor 34 produces rotary driving power in the direction of arrow F the upper run of each of the conveyor belts 27—33 is moved in the direction of F', and the lower return run of each of the conveyor belts moves in the direction of arrow R. When a load is placed upon the elastic belt 27 at pulley 13, it will initially be moved at a relatively slow velocity and the load will be moved with a positive acceleration toward the pulley 14. The elastic belt 27 progressively extends as it moves toward the pulley 14, and as the load-carrying run of the belt 27 engages the pulley 14, the belt, at that point, will have the velocity of the peripheral surface of the pulley 14. The load will then be driven by the belt 27 onto the second elastic belt 28. The end of the load-carrying run at pulley 15 has a linear velocity identical to the linear velocity of belt 27 at pulley 14, because of the one to one speed ratio between the pulleys 14 and 15. The load will again accelerate as it moves along the load-carrying run of belt 28 between the pulleys 15 and 16. And of course additional acceleration will be imparted to the load as it passes over the conveyor belt 29 and onto the constant speed conveyor 33.

Because of the one to one speed ratio between the pulleys 20 and 21, elastic belt 30 has a linear velocity at the end of the load-carrying run adjacent pulley 21, which is identical to the velocity of the constant speed belt 33. As the elastic belt 30 moves along the load-carrying run from the pulley 21 to the pulley 22 the material in the belt contracts longitudinally because of the speed differential between the driving pulleys therefor, and the load carried by the pulley 30 progressively accelerates in a negative sense or decelerates. In a similar manner, the velocity of the load is progressively decreased as it moves along the elastic belts 31 and 32.

The form of the invention shown in Figs. 3 and 4 is similar to that shown in Figs. 1 and 2 in construction and operation with the exception that the form in Figs. 3 and 4 provides a substantially continuous conveying surface which increases the velocity of the load to a high speed and then subsequently decreases the velocity of the load again to permit removal thereof from the conveyor or to permit handling of the load in any desired manner. The form of the invention shown in Figs. 3 and 4 includes a supporting structure indicated in general by numeral 40 and having a pair of side frame members 41 upon which a plurality of rollers 42—50 are journalled. A plurality of endless, elastic belts 51 are trained around the pulleys 42 and 43 and are spaced from each other. A plurality of endless elastic belts 52 are trained around the pulleys 43 and 44 and are disposed on the pulley 43 between the adjacent belts 51. In a similar manner, belts 53, 54, 55, 56 and 57 are trained around adjacent pairs of pulleys. The belts 51—53 and 55—57 are elastic and the belts 54 are substantially non-stretchable. A source of rotary power or motor 58 is drivably connected by chain 59 to the shaft of pulley 46 for supplying rotary power to the entire conveyor system. The shaft of pulley 46 is drivably connected in a one-to-one speed ratio by chain 46a to pulley 45. Pulley 45 is drivably connected in a step-down speed ratio to pulley 44 by chain 45a, and pulley 44 is connected in a step-down speed ratio to pulley 43 by chain 44a, and pulley 43 is drivably connected in a step-down speed ratio to the pulley 42 by chain 43a. Similarly driving connections are provided for pulleys 47, 48 and 50 in progressively step-down speed ratios by chains 46b, 47a and 48a.

It will be seen therefore that the rotation speeds of the pulleys progressively increase from pulley 42 to pulley 45, and the rotation speed of these pulleys progressively decrease from the pulley 46 to the pulley 50. The linear velocity of belt 51 progressively increases from pulley 42 to pulley 43 due to progressive elongation of the belts 51 along their load-carrying runs. The linear velocities of belts 51 and 52 at the pulley 43 are identical and the linear velocity of a point on each of the belts 52 progressively increases along the load-carrying run between the pulleys 43 and 44. The linear velocity of a point on each of the belts 55 progressively decreases due to longitudinal contraction of the belt along the load-carrying run between the pulleys 46 and 47.

Therefore a load applied on the elastic belts 51 will be progressively accelerated in a positive sense as it moves along the load-carrying run of belts 51 and will be further accelerated in a positive sense as it moves along the load-carrying run of belts 52, and will be progressively accelerated in a positive sense on belt 53 so that it may be carried at a high rate of speed along the constant speed conveyor 54. The load will be progressively accelerated in a negative sense as it moves along the load-carrying run from pulley 46 to pulley 47 on conveyor belt 55 and the speed will be further decreased as the load moves to the pulley 50.

It should be specifically pointed out here that within the scope of the invention, the load-supporting structure which is exemplified by the elastic belt in Figs. 1–4 needs only to be constructed in such a manner that longitudinally spaced portions be permitted to simultaneously assume different conditions of extension and retractions, or putting this concept in another way, the load-supporting structure should be of the nature to permit varying degrees of extension along the length thereof. In this regard, using the elastic conveyor belt 27 as an example, it will be particularly noted that when the belt 27 is in a relatively relaxed or longitudinally retracted condition as it moves off the relatively low speed pulley 13, and that the belt is substantially extended as it moves onto the pulley 14. Therefore it will be clearly seen that longitudinally spaced portions of the belt 27 assume varying conditions of extension and retraction, and that between the pulleys 13 and 14, the belts 27 is progressively extended.

As another specific example of such a load-supporting structure, it can be understood that a lazy tongs type construction having lost-motion pivotal connections between cooperating links may assume varying conditions of extension and retraction along the length thereof.

The form of the invention shown in Figs. 6 and 7 embodies another form of the invention wherein a pair of track members 60 and 61 are provided for carrying a load-supporting structure. Portions 60a and 61a are substantially parallel to each other and provide the constant speed portion for the overall conveyor. Portions 60b and 61b are forwardly convergent in relation to the direction of movement of the load-supporting structure which may be in the direction of arrow X.

The load-supporting structure in this form of the invention is constructed in a plurality of individual units which are indicated in general by numeral 62. Each of the units 62 is constructed to be individually extendible and retractable, and is connected to the next adjacent unit. Each of the units 62, in the form shown, includes a non-rotatable mounting shaft 63 which has a pair of inwardly and outwardly slidable roller-mounting bearings 64 non-rotatably mounted thereon. Rollers 65 are mounted on the bearings 64 and are constructed for cooperative interfitting with the track members 60 and 61 so as to remain in rolling engagement therewith by shifting inwardly along the shaft 63 as the track members converge inwardly as at 60b and 61b, and as the track members diverge from each other again. A pair of transverse frame elements 66 are affixed to the shaft 63 and provide slide bearings at 67 for a pair of slide members 68 which may be telescopically related with each other at their inner ends. A pair of supporting cross links 69 are swingably interconnected intermediate the ends thereof and are pivotally secured to the wheel mounting bearings 64. The other ends of cross links 69 are connected to the other ends of the slides 68. The adjacent units 62 are thereby secured together and as the rollers move along the convergent track, the rollers slide inwardly along the shaft 63 causing the forward ends of cross links 69 to swing inwardly toward each other which results in an increase in the spacing between shaft 63 of adjacent units 62. As a result, the velocity of the shafts 63 progressively increases as the individual shafts move along the track from the parallel portions to the convergent portions, and in a generally similar manner, the velocity of each of the shafts progressively decreases as the shaft moves along a divergent portion of track.

The form of the invention shown in Figs. 6 and 7 also includes in each of the units 62 an extendible and retractable surface-defining media, which in this specific form may comprise an elongated strip of non-stretchable flexible material such as heavy canvas or webbing and which is indicated by the numeral 70. One end of the elongated strip 70 overlies one pair of the cross links 69 and is connected as by rivets 71 to a flat plate 72 which is stationary with the shaft 63 disposed immediately therebelow. Means are provided for winding the flexible strip 70 on the shaft 63 to facilitate lengthening and retracting of the strip 70 between the adjacent plates 72. In the form shown, such means include a rotary sleeve 73 on the shaft 63 and a spring 74 normally urging the sleeve 73 to rotate on the shaft 63 in the direction of arrow S. The end of the strip 70 is suitably affixed to the sleeve 73 and a portion of the strip 70 is wound on the sleeve, much in the fashion of a roller-type window shade. A substantially cylindrical housing 75 may be carried on the shaft 63 to enclose the sleeve 73 and the portion of the strip 70 wound thereon. The housing 75 has an opening 76 in the upper portion thereof and extending at least throughout the width of the strip 70 to facilitate movement of the strip 70 therethrough. It will therefore be seen that as the adjacent mounting shafts 63 move away from each other, the strip 70 will be pulled out and unwound from the spool-forming sleeve 73; and when the adjacent mounting shaft 63 move closer together a portion of the strip 70 will be wound onto the sleeve 73.

It should be understood that in the form shown, it is contemplated that each of the tracks 60 and 61 will be endless and will define an oblong endless path about which the load-supporting structure moves, much in the fashion of a conventional conveyor belt. If the load carried by the conveyor is to be accelerated in a positive sense, the load-carrying run of the conveyor will have converging track portions so as to progressively lengthen the units 62 as they travel through the load-carrying run. In such arrangements, the tracks 60 and 61 will necessarily be divergent along another portion of the conveyor structure, such as along the return run, so as to shorten the individual units 62 of the load-supporting structure.

Suitable driving mechanism is provided for the moving load-supporting structure so as to move all portions of the load-supporting structure at a particular speed as its passes a particular location on the tracks 60 and 61. From this particular location on the tracks, the load-supporting structure will be extended and will accelerate as the track converges, or will slow down, or accelerate in a negative sense as the track diverges. In the form shown, the driving means includes a plurality of substantially constant torque, variable speed motors 77 each having a rotary driving sleeve 78 slidable into and out of the motor housing and connected through a flexible coupling 79 in driving relation with one of the rollers 65. Sleeve 78 receives the shaft 63 therethrough for supporting the motor on the shaft, and suitable framework such as the frame element 80 will be provided for maintaining the motor stationary with respect to the mounting shaft 63. Of course the motors may be powered through suitable sliding contacts (not shown). The constant torque motors will drive the rollers 65 at an increased speed as the rollers move over the converging portion of the tracks and will of course drive the rollers at a slower rate in diverging portions of the track.

In this embodiment of the invention it will be seen that the converging tracks provide means for progressively varying the degree of extension of the load-supporting structure as the same moves along the load-carrying run of the conveyor, and for correspondingly producing a velocity differential between longitudinally spaced portions of the load-supporting structure.

It will be particularly noted that the structure described in connection with Figs. 6 and 7 and embodying the broad aspects of the present invention eliminates need for elasticity in the load-supporting structure, because the individual units are extended and retracted in relation to the convergence or divergence of the tracks. The torsion spring 74 facilitates storage of the flexible strip 70 in small compass and in coiled relation on the sleeve 73.

The form of the invention shown in Fig. 5 is substantially identical to that shown in Figs. 1 and 2 and is well adapted for accelerating loads such as ore and other types of conglomerate material. The elastic belts 90 are each trained over pulleys 91 and 92, the former of which is disposed over the pulley 92 of the next adjacent conveyor stage in a forward direction so that the aggregate or conglomerate carried by the belt 90 is deposited directly onto the next acceleration stage of the conveyor. It is to be observed that the pulleys 91 and 92 are interconnected and driven at different rotary speeds by the chain 93 and cooperating small and large sprockets.

The form of the invention shown in Figs. 9 and 10 is similar to the other forms of the invention, in that elastic elements are used, with spaced portions thereof moving at different velocities so that there is a velocity gradient along the length thereof. In this form of the invention the elastic elements are of finite length and the elements are vertically reciprocated for engagement with a load carried thereon and the elastic elements are reciprocated longitudinally at one end with the other end being held substantially stationary so as to produce a velocity gradient between the ends from substantially zero feet per second to a maximum speed at the other end.

More specifically the form of the invention shown in Figs. 9 and 10 includes a plurality of conveyor units indicated in general by the numeral 100, 101 and 102. Each of the units 100, 101 and 102 is substantially identical to the other units, and for simplicities sake, only one of the units is shown in elevation in Fig. 10. The unit 100 in Fig. 10 includes a rigid skid plate 103 guided at its opposite ends for vertical movement by rigid structure 104 which may comprise a building floor or the like. The unit 100 has an elongated, non-stretchable or inelastic load-carrying element 105 slidably supported on the skid plate 103 and disposed intermediate the ends thereof. A pair of elongated longitudinally extendible and retractable elastic elements 106 and 107 are slidable on the skid plate 103 and arranged in end-to-end relation with the opposite ends of the inelastic element 105. The elastic elements 106 and 107 are secured at their ends to the opposite ends of the inelastic element 105 as by fasteners 108. The other, outer end of the elastic elements 106 and 107 are anchored to the ends of the skid plate 103 by any suitable means such as rivets 109. The elastic elements 106 and 107 have an initial tension thereon so as to permit substantial retraction thereof without causing buckling or bending thereof.

It will also be noted that the elastic elements 106 and 107 have reduced thicknesses at positions intermediate the ends thereof, as at 106a and 107a respectively, and therefore have reduced cross sectional areas at the intermediate portions with respect to the opposite end portions thereof. The unit 100 is provided with means for producing limited vertical reciprocation of the skid plate 103 and of the elements 105, 106 and 107 and for longitudinally reciprocating the inelastic element 105, and therefore longitudinally reciprocating the inner ends of the elastic elements 106 and 107. In the form shown, such means include a rotary driving gear 110 affixed to a rotary shaft 111 which is connected to a source of rotary power (not shown). Gear 110 is meshed with a driven gear 112 which is carried on a rotary, but stationary shaft 113 in suitable bearings (not shown). Gear 112 is meshed with the teeth on gear rack 114, the teeth in which are arranged in an oval so as to produce, as gear 112 is revolved, substantially constant velocity linear movement in the direction of arrows 15 and to also produce limited vertical reciprocation. Rack 114 is guided, in part, by gear 112 and is also guided by cam 116 around which, roller 117 goes in the direction of arrows 118. Roller 117 is journalled on a stub-shaft 119 which is fixed to a depending arm affixed to the rack 114 as by welding 121.

The horizontal and vertical reciprocating movement of the rack 114 is transmitted to the load-carrying elements by means of a linkage mechanism which includes an elongated link 122 connected by pivot 123 to rack 114 and connected by a pivot 124 to a slide which is suitably guided as by guide 126 for horizontal reciprocating movement. An upstanding arm 127 is swingably connected as by pivot 128 to the link 122 intermediate the ends thereof, and has a skid plate lifting member 128 affixed thereto and movable therewith. Arm 127 also has a projection 129 extending upwardly from the member 128 and through an elongated slot 130 in the skid plate 103. The projection 129 is frictionally engageable with the inelastic element 105 for longitudinally reciprocating the same along the skid plate 103.

Another similar driving mechanism may be provided for operating on the other end of the inelastic element 105 to operate in synchronism with the mechanism shown in detail. The other driving mechanism is shown in part by the upstanding arm 127', the skid plate lifting member 128' and the upward projection 129' which extends through an elongated slot 130' in the skid plate 103.

It should be understood that each of the units 100, 101 and 102 are substantially identically constructed and are each driven by mechanisms similar to that shown in Fig. 10. The driving mechanisms of the units 100, 101 and 102 are arranged to be out of phase with each other, and in the form shown, the units will be approximately 120 degrees out of phase with each other so that the units will be moved upwardly and the elements 105 will be moved in the direction of arrow 131 progressively in the order 100, 101 and 102 whereby to cause the load to be progressively supported by these units in that order and moved along from one end thereof to the other.

It will be noted that each time the units are raised, the inelastic element 105 and the inner ends of elastic elements 106 and 107 are moved in the direction of arrow 131 so as to stretch the element 106 and cause contraction of the element 107. Assume that the inelastic element 105 is moved with a velocity of $V_5$. A load such as a box L applied to the left hand end of the element 106 will be progressively moved toward the right and the velocity thereof will be progressively increased as the load L passes toward the inelastic element 105. The load will then be carried at a constant speed across the inelastic elements to the right, and the speed of the load L will be subsequently decreased as it progresses toward the right hand end of the elastic element 107.

The increase in velocity of the load L as it passes over the element 106 is produced because the velocity of the various portions of element 106 progressively increases from zero at the left hand end to $V_5$ at the right hand end. Because the thickness or cross sectional area of the element 106 is diminished at 106a intermediate the ends thereof, this intermediate portion will stretch substantially more than the end portions will, and therefore the velocity gradient on this intermediate portion 106a will be substantially greater than at the end portions. As a result, the speed characteristics of the load L on the element 106 may be substantially sinusoidal when plotted against the length of the element 106. By varying the cross-sectional thickness of the element 106, the speed characteristics of the load all may take any desired form. The velocity of the load L will decrease in a similar fashion as it passes from the left to right over the element 107.

It will be seen that I have provided a new and improved load-accelerating conveyor whereby a load may be applied to one end of the conveyor which is moving at a relatively slow rate of speed, and the load will be accelerated as it moves along the load-carrying run so that it may be moved onto a long distance high speed conveyor moving at a uniform rate. It should be particularly understood that the multi-stage acceleration conveyor may be disposed in juxtaposition in rleation to the high speed, constant speed conveyor, as well as in the end-to-end relation shown in the figures.

It should be particularly understood that where, the term "acceleration" is used in the appended claims, the meaning of this term is not to be limited to acceleration in the positive sense but is also to specifically include acceleration in a negative sense, or deceleration.

It will, of course, be understood that various changes may be made in the form, detail, arrangement and proportion of the parts without departing from the scope of my invention which consists of the matter described herein and set forth in the appended claims.

What I claim is:

1. A load accelerating conveyor comprising a pair of juxtaposed elongated extendible and retractable load-carrying elements, means individually supporting said elements for limited vertical reciprocation, means anchoring one end of each element to prevent longitudinal movement, and drive mechanism longitudinally reciprocating the other ends of the elements out of phase with each other and also vertically reciprocating said elements, whereby to progressively move the load from one end of the juxtaposed elements to the other end and to progressively vary the speed of the load.

2. A load-accelerating conveyor comprising a pair of juxtaposed, elongated and elastic load-carrying elements, means individually supporting said elements for limited vertical reciprocation, means anchoring one end of each of said elements to prevent longitudinal movement of said ends, and drive mechanism longitudinally reciprocating the other ends of the elements out of phase with each other and also vertically reciprocating said elements, whereby to progressively move the load from one end of the juxtaposed elements to the other end and to progressively vary the speed of the load.

3. A load-accelerating conveyor comprising a pair of juxtaposed, elongate, and elastic load-carrying elements constructed with varying stretchability characteristics along the length thereof whereby when tension is varied on one of the elements, certain portions thereof will stretch to a degree different than other portions thereof, means individually supporting said elements for limited vertical reciprocation, means achoring one end of each element to prevent longitudinal movement and drive mechanism longitudinally reciprocating the other ends of the elements out of phase with each other and also vertically reciprocating said elements whereby to progressively move the load from one end of the juxtaposed elements to the other end and to progressively vary the speed of the load along said elements in relation to the stretchability characteristics of the elements.

4. A load-accelerating conveyor comprising a pair of elongate, juxtaposed and elastic load-carrying elements of varying cross-sectional area along the length thereof to thereby permit certain portions of the elements to stretch longitudinally to an extent different than other portions of said elements, means individually supporting said elements for limited vertical reciprocation, means anchoring one end of each element to prevent longitudinal movement, and drive mechanism longitudinally reciprocating the other ends of the elements out of phase with each other and also vertically reciprocating said elements out of phase with each other, whereby to progressively move the load from one end of the juxtaposed elements to the other end and to progressively vary the speed of the load in relation to the varying cross-sectional area of said elements.

References Cited in the file of this patent

UNITED STATES PATENTS

| | | |
|---|---|---|
| 770,260 | Cahill | Sept. 20, 1904 |
| 2,769,522 | Pfeiffer | Nov. 6, 1956 |
| 2,862,603 | Sinden | Dec. 2, 1958 |